United States Patent
Miyabe

(10) Patent No.: US 8,121,138 B2
(45) Date of Patent: Feb. 21, 2012

(54) COMMUNICATION APPARATUS IN LABEL SWITCHING NETWORK

(75) Inventor: Masatake Miyabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/412,861

(22) Filed: Mar. 27, 2009

(65) Prior Publication Data

US 2009/0316713 A1    Dec. 24, 2009

(30) Foreign Application Priority Data

Jun. 20, 2008   (JP) ................................ 2008-161803

(51) Int. Cl.
  *H04L 12/28*   (2006.01)
(52) U.S. Cl. ........ 370/412; 370/230; 370/233; 370/236; 370/252; 370/410
(58) Field of Classification Search ................. 370/230, 370/231, 232, 233, 234, 235, 236, 252, 410, 370/412
See application file for complete search history.

(56) References Cited

U.S. PATENT DOCUMENTS

| | | | | |
|---|---|---|---|---|
| 6,092,113 A * | 7/2000 | Maeshima et al. | ........... | 709/230 |
| 6,633,571 B1 * | 10/2003 | Sakamoto et al. | ........... | 370/401 |
| 6,665,273 B1 * | 12/2003 | Goguen et al. | ................ | 370/252 |
| 6,771,662 B1 * | 8/2004 | Miki et al. | ..................... | 370/469 |
| 6,895,008 B2 * | 5/2005 | Enoki et al. | .................... | 370/392 |
| 6,985,488 B2 * | 1/2006 | Pan et al. | ................... | 370/395.3 |
| 7,136,357 B2 * | 11/2006 | Soumiya et al. | ............. | 370/236 |
| 7,136,374 B1 * | 11/2006 | Kompella | ..................... | 370/352 |
| 7,336,648 B1 * | 2/2008 | Sasagawa | ..................... | 370/351 |
| 7,463,639 B1 * | 12/2008 | Rekhter | ......................... | 370/409 |
| 7,489,695 B1 * | 2/2009 | Ayyangar | ..................... | 370/396 |
| 7,516,224 B2 * | 4/2009 | Guichard et al. | ............ | 709/227 |
| 7,551,551 B2 * | 6/2009 | Filsfils et al. | ................ | 370/219 |
| 7,558,199 B1 * | 7/2009 | Minei et al. | .................... | 370/230 |
| 7,564,871 B2 * | 7/2009 | Liu | ............................... | 370/468 |
| 7,620,069 B2 * | 11/2009 | Kompella | ..................... | 370/469 |
| 7,664,877 B1 * | 2/2010 | Sheth | .......................... | 709/242 |
| 7,733,876 B2 * | 6/2010 | Davie et al. | ............. | 370/395.53 |
| 7,801,138 B2 * | 9/2010 | Du et al. | ....................... | 370/392 |
| 7,961,599 B2 * | 6/2011 | Proulx | .......................... | 370/218 |
| 2002/0103924 A1 * | 8/2002 | Nomura | ........................ | 709/235 |
| 2003/0044262 A1 * | 3/2003 | Inui | ......................... | 414/331.01 |
| 2003/0088699 A1 * | 5/2003 | Luciani et al. | ................ | 709/243 |
| 2003/0137971 A1 * | 7/2003 | Gibson et al. | ................ | 370/351 |
| 2003/0161264 A1 * | 8/2003 | Ho et al. | ....................... | 370/229 |

(Continued)

OTHER PUBLICATIONS

E. Rosen et al., "Multiprotocol Label Switching Architecture", Network Working Group Request for Comments 3031; Jan. 2001; pp. 1-64.

(Continued)

*Primary Examiner* — Ayaz Sheikh
*Assistant Examiner* — Andrew C Lee
(74) *Attorney, Agent, or Firm* — Fujitsu Patent Center

(57) ABSTRACT

In a label switching network using a plurality of labels, a communication apparatus receives signaling information for setting a first label switching tunnel. This signaling information includes one or more values of one or more labels representing one or more pseudowires accommodated in a first label switching tunnel, the bandwidth information of the pseudowire, and the bandwidth-sharing identifier. A bandwidth management table holding correspondence relationships between values of a plurality of labels, the bandwidth information, and the bandwidth-sharing identifiers are generated. One or more second label switching tunnels may be accommodated instead of one or more pseudowires.

14 Claims, 18 Drawing Sheets

| OUTPUT IF | MPLS tunnel | MPLS tunnel label VALUE | Inner label VALUE | WHETHER BANDWIDTH CAN BE SHARED | BANDWIDTH-SHARING IDENTIFIER | BANDWIDTH |
|---|---|---|---|---|---|---|
| IF2 | Tunnel 1 | 45 | 15 | CANNOT BE SHARED | | 100Mbps |
| IF2 | Tunnel 2 | 46 | 22 | CAN BE SHARED | 101 | 100Mbps |
| IF2 | Tunnel 2 | 46 | 23 | CAN BE SHARED | 200 | 100Mbps |
| IF2 | Tunnel 4 | 47 | | | | 200Mbps |
| IF2 | (UNUSED) | (UNUSED) | | | | 500Mbps |

U.S. PATENT DOCUMENTS

| | | | | |
|---|---|---|---|---|
| 2004/0004955 A1* | 1/2004 | Lewis | | 370/351 |
| 2004/0010617 A1* | 1/2004 | Akahane et al. | | 709/243 |
| 2004/0174879 A1* | 9/2004 | Basso et al. | | 370/392 |
| 2004/0213228 A1* | 10/2004 | Tingle et al. | | 370/389 |
| 2005/0160171 A1* | 7/2005 | Rabie et al. | | 709/227 |
| 2005/0271035 A1* | 12/2005 | Cohen et al. | | 370/351 |
| 2006/0002423 A1* | 1/2006 | Rembert et al. | | 370/466 |
| 2006/0146710 A1* | 7/2006 | Roy | | 370/235 |
| 2006/0159084 A1* | 7/2006 | Shimizu et al. | | 370/389 |
| 2006/0251074 A1* | 11/2006 | Solomon | | 370/392 |
| 2007/0030851 A1* | 2/2007 | Sinicrope et al. | | 370/392 |
| 2007/0127479 A1* | 6/2007 | Sinicrope et al. | | 370/392 |
| 2007/0280102 A1* | 12/2007 | Vasseur et al. | | 370/225 |
| 2008/0084890 A1* | 4/2008 | Kompella | | 370/400 |
| 2008/0144641 A1* | 6/2008 | Le Roux et al. | | 370/401 |
| 2009/0154453 A1* | 6/2009 | Shah et al. | | 370/389 |
| 2010/0040206 A1* | 2/2010 | DelRegno et al. | | 379/32.01 |

OTHER PUBLICATIONS

E. Rosen et al., "MPLS Label Stack Encoding", Network Working Group Request for Comments 3032; Jan. 2001 1-23.

S. Bryant et al., "Pseudo Wire Emulation Edge-to-Edge (PWE3) Architecture", Network Working Group Request for Comments 3985; Mar. 2005; pp. 1-46.

L. Anderson et al. Framework for Layer 2 Virtual Private Networks (L2VPNs), Network Working Group Request for Comments 4664; Sep. 2006; pp. 1-48.

D. Awduche et al. "RSVP-TE: Extensions to RSVP for LSP Tunnels", Network Working Group Request for Comments 3209; Dec. 2001; pp. 1-66.

L. Anderson et al., "LDP Specification" Network Working Group Request for Comments 3036; Jan. 2001; pp. 1-142.

L. Martini et al., "Pseudowire Setup and Maintenance Using the Label Distribution Protocol (LDP)", Network Working Group Request for Comments 4447; Apr. 2006; pp. 1-36.

* cited by examiner

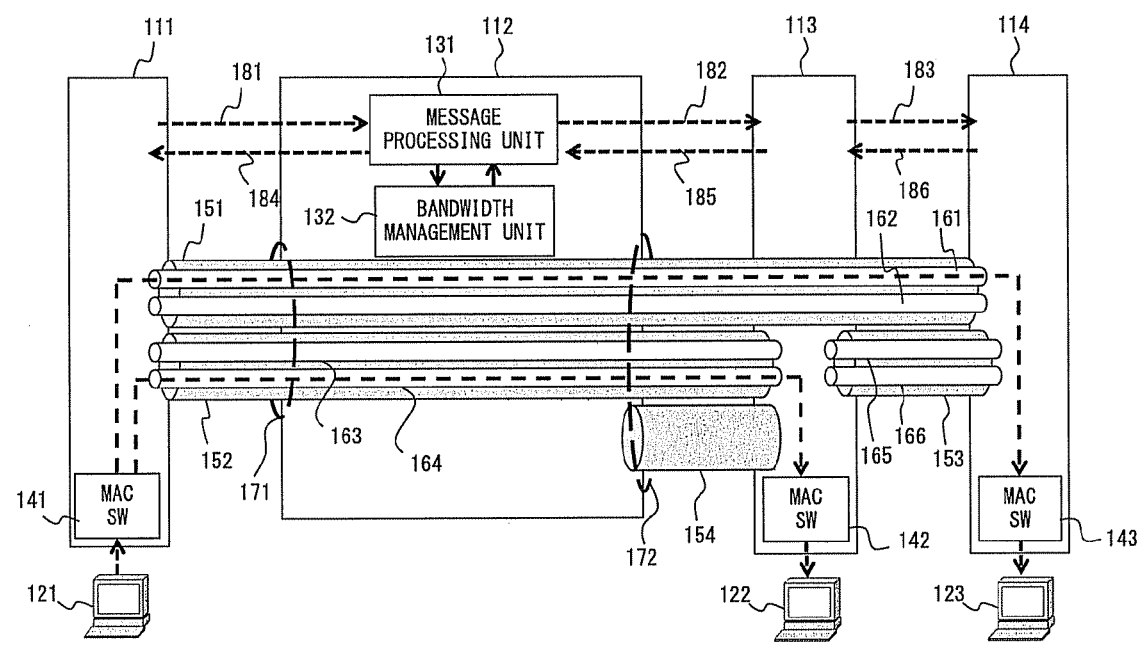
F I G. 1

| OUTPUT IF | MPLS tunnel | MPLS tunnel label VALUE | Inter label VALUE | WHETHER BANDWIDTH CAN BE SHARED | BANDWIDTH-SHARING IDENTIFIER | BANDWIDTH |
|---|---|---|---|---|---|---|
| IF2 | Tunnel1 | 45 | 15 | CANNOT BE SHARED | | 100Mbps |
| IF2 | Tunnel2 | 46 | 22 | CAN BE SHARED | 101 | 100Mbps |
| IF2 | Tunnel2 | 46 | 23 | CAN BE SHARED | 200 | 100Mbps |
| IF2 | Tunnel4 | 47 | | | | 200Mbps |
| IF2 | (UNUSED) | (UNUSED) | | | | 500Mbps |

FIG. 4

| OUTPUT IF | MPLS tunnel | MPLS tunnel Label VALUE | inter label VALUE | WHETHER BANDWIDTH CAN BE SHARED | BANDWIDTH-SHARING IDENTIFIER | BANDWIDTH |
|---|---|---|---|---|---|---|
| IF2 | Tunnel1 | 45 | 15 | CANNOT BE SHARED | | 100Mbps |
| IF2 | Tunnel1 | 45 | 16 | CAN BE SHARED | 101 | 100Mbps |
| IF2 | Tunnel2 | 46 | 22 | CAN BE SHARED | 101 | |
| IF2 | Tunnel2 | 46 | 23 | CAN BE SHARED | 200 | 100Mbps |
| IF2 | Tunnel4 | 47 | | | | 200Mbps |
| IF2 | (UNUSED) | (UNUSED) | | | | 500Mbps |

F I G. 9

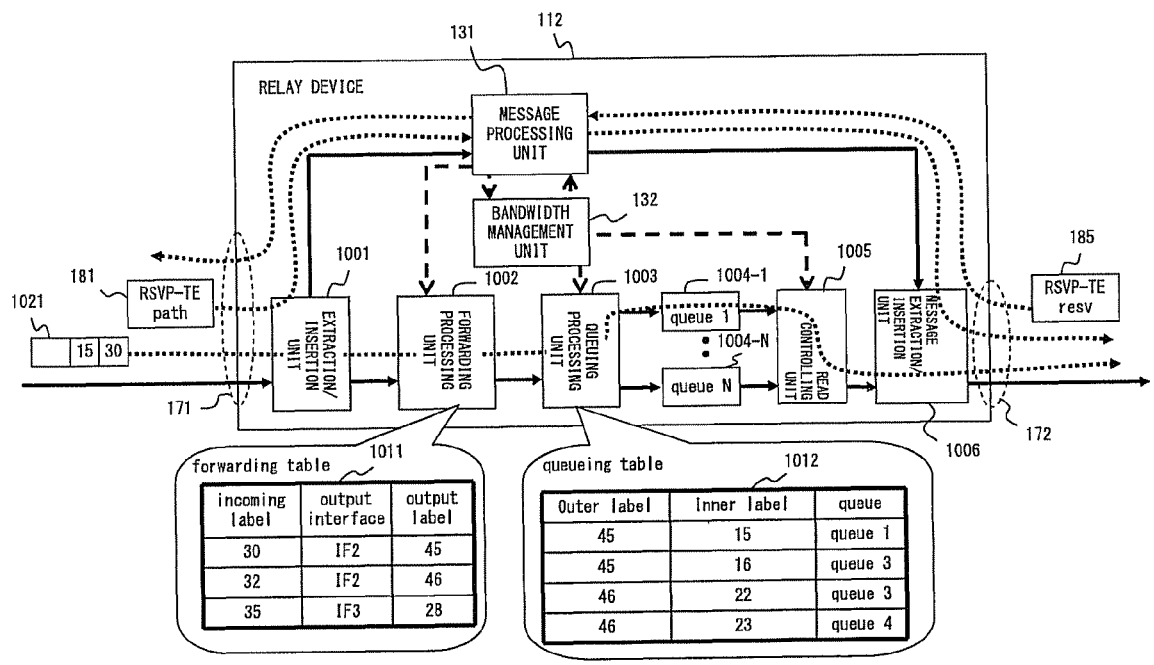
F I G. 10

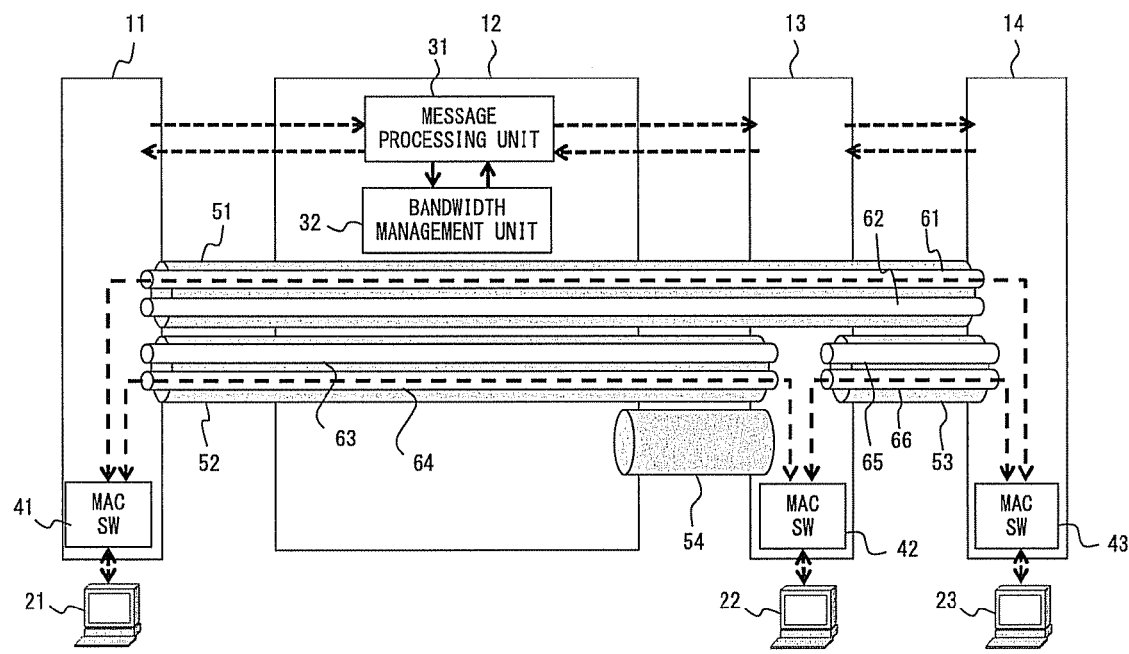
F I G. 13

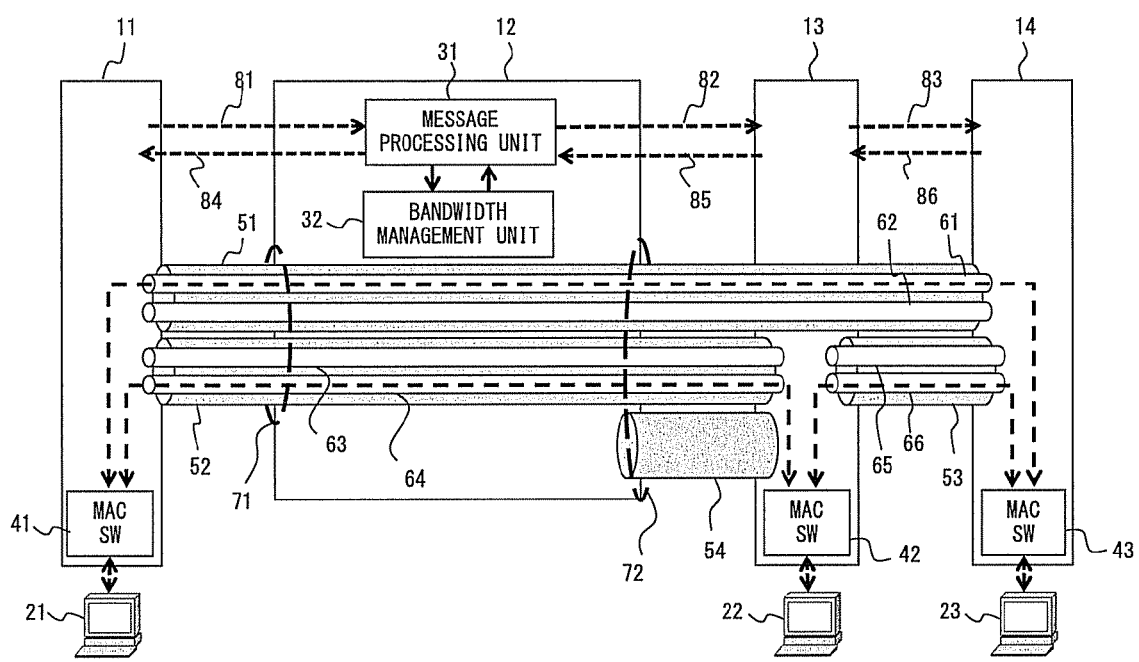
F I G. 15

| OUTPUT IF | MPLS tunnel | MPLS tunnel label VALUE | BANDWIDTH |
|---|---|---|---|
| IF2 | Tunnel1 | 45 | 200Mbps |
| IF2 | Tunnel2 | 46 | 200Mbps |
| IF2 | tunnel4 | 47 | 200Mbps |
| IF2 | (UNUSED) | (UNUSED) | 400Mbps |

FIG. 16

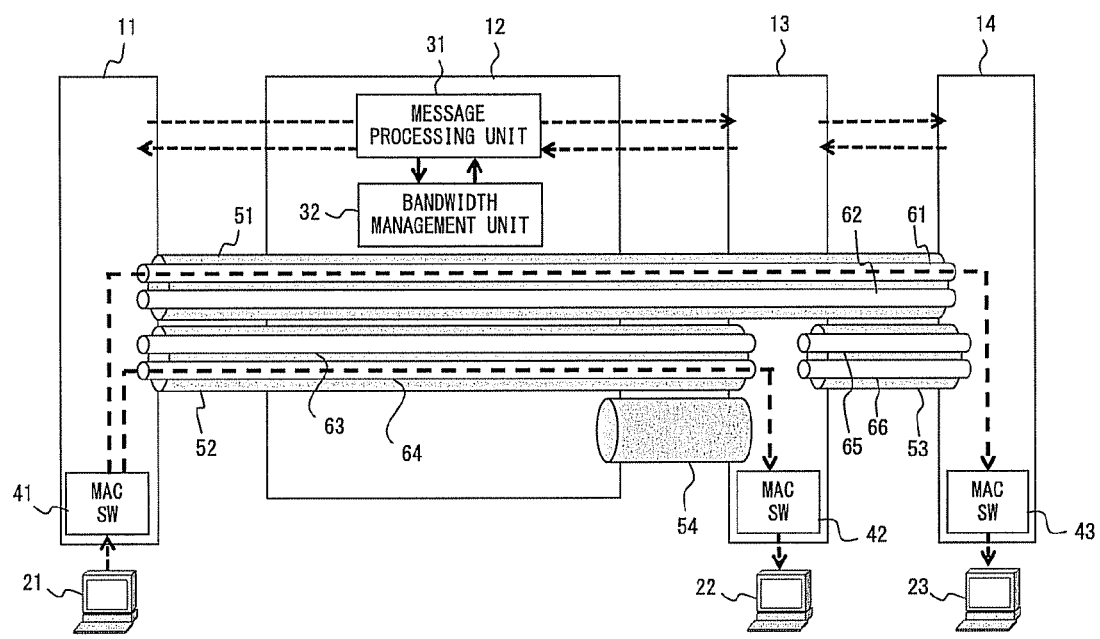
F I G. 18

COMMUNICATION APPARATUS IN LABEL SWITCHING NETWORK

CROSS-REFERENCE TO RELATED APPLICATIONS

This application is based upon and claims the benefit of priority of the prior Japanese Patent Application No. 2008-161803, filed on Jun. 20, 2008, the entire contents of which are incorporated herein by reference.

FIELD

The embodiments discussed herein are related to a communication apparatus used in a communication network that provides a service using packets each having a plurality of labels, such as a pseudowire in a Multi Protocol Label Switching (MPLS) network.

BACKGROUND

FIG. 13 illustrates an example of a configuration of a communication network that provides a service of a wide area Ethernet (registered trademark) Local Area Network (LAN) in an MPLS network. In this example, services are provided using a pseudowire and a Virtual Private LAN service (VPLS).

In the MPLS network, there exist edge devices 11, 13 and 14 and a relay device 12. User terminal devices 21, 22 and 23 are respectively connected to the edge devices 11, 13, and 14. The user terminal devices 21, 22, and 23 are provided with the same Ethernet (registered trademark) LAN service. The relay device 12 includes a message processing unit 31 and a bandwidth management unit 32.

In this type of MPLS network, an MPLS tunnel is first set between edge devices that provide services. In the example illustrated in FIG. 13, full-mesh MPLS tunnels are to be set between the edge devices 11, 13, and 14 that are connected to the user terminal devices 21, 22, and 23. Accordingly, an MPLS tunnel 51 is set between the edge devices 11 and 14, an MPLS tunnel 52 is set between the edge devices 11 and 13, and an MPLS tunnel 53 is set between the edge devices 13 and 14.

In order to generate and maintain these MPLS tunnels, signaling messages are exchanged respectively between the edge device 11 and the relay device 12, between the relay device 12 and the edge device 13, and between the edge device 13 and the edge device 14. The message processing unit 31 in the relay device 12 transmits and receives signaling messages.

Next, a Media Access Control (MAC) switch is virtually set for each of the Ethernet (registered trademark) LAN services, and pseudowires are set in the MPLS tunnels so that those MAC switches are connected to each other in a full mesh configuration. In this configuration, Ethernet (registered trademark) LAN services can be provided.

In the example illustrated in FIG. 13, MAC switches 41, 42, and 43 are set respectively for the edge devices 11, 13 and 14 in order to provide a certain service. Further, a pseudowire 61 is set between the MAC switches 41 and 43, a pseudowire 64 is set between the MAC switches 41 and 42, and a pseudowire 66 is set between the MAC switches 42 and 43.

An MPLS tunnel can be shared by a plurality of pseudowires. For example, the pseudowires 62, 63, and 65 in FIG. 13 are pseudowires set for another service. The pseudowires 61 and 62 share the MPLS tunnel 51, the pseudowires 63 and 64 share the MPLS tunnel 52, and the pseudowires 65 and 66 share the MPLS tunnel 53.

It is also possible to set MPLS tunnels between the relay device 12 and the edge devices 11, 13, and 14. In the example illustrated in FIG. 13, an MPLS tunnel 54 is set between the relay device 12 and the edge device 13.

FIG. 14 illustrates an example of a configuration of a packet exchanged between the edge devices in the MPLS network illustrated in FIG. 1. In the packet illustrated in FIG. 14, labels in a two-stage configuration, i.e., an MPLS tunnel label and a pseudowire label, are added to an Ethernet (registered trademark) MAC frame, which is information on a service layer (service layer information). Thereby, a MAC frame is encapsulated in a pseudowire, and is further encapsulated in an MPLS tunnel.

Generally, a bandwidth has to be guaranteed for an MPLS tunnel that is being set in order to provide a service that guarantees a bandwidth in an Ethernet (registered trademark) LAN.

As illustrated in FIG. 15, bandwidth information to be used for the MPLS tunnel 51 is reported, being contained in a Resource Reservation Protocol-Traffic Engineering (RSVP-TE) Path message 81, which is a signaling message for the MPLS tunnel 51. For example, as the identifier of the MPLS tunnel 51, Tunnel1 is reported, and as bandwidth information, 200 Mbps is also reported.

When receiving the RSVP-TE Path message 81 from the edge device 11, the message processing unit 31 in the relay device 12 determines an output interface on the basis of the destination information of the MPLS tunnel.

In the example illustrated in FIG. 15, the relay device 12 communicates with the edge device 11 via an interface 71 and communicates with the edge device 13 via an interface 72. The edge device 13 is connected to the edge device 14. Accordingly, the interface 72 is selected as the output interface for the MPLS tunnel 51.

The bandwidth management unit 32 determines whether or not there is an unused bandwidth as required in the above selected output interface. For this purpose, the bandwidth management unit 32 has a bandwidth management table as illustrated in FIG. 16 for each output interface.

On the bandwidth management table illustrated in FIG. 16, identifier IF2 of the interface 72, identifiers, label values, and bandwidth information of the MPLS tunnels 51, 52, and 54 using the interface 72 as an output interface are registered. Tunnel1, Tunnel2, and Tunnel4 are the identifiers of the MPLS tunnels 51, 52, and 54, respectively. The numbers 45, 46, and 47 are the label values of the MPLS tunnels 51, 52, and 54 respectively.

FIG. 17 is a flowchart illustrating an MPLS tunnel setting process performed by the bandwidth management unit 32. The bandwidth management unit 32 first checks whether or not the RSVP-TE Path message 81, which is a request for setting an MPLS tunnel, includes a bandwidth request (step 91). When that message includes a bandwidth request, the bandwidth management unit 32 refers to a bandwidth management table in order to check whether or not the output interface has an unused bandwidth equal to or broader than the requested bandwidth (step 92).

When the output interface has an unused bandwidth equal to or broader than the requested bandwidth, the bandwidth management unit 32 reduces that unused bandwidth in the output interface by the bandwidth of the requested bandwidth, and generates an entry of a new MPLS tunnel in the bandwidth management table (step 94). Thereafter, the bandwidth management unit 32 reports to the message processing unit 31 the fact that the request for setting an MPLS tunnel is accepted (step 95).

When receiving this report, the message processing unit 31 transmits to the edge device 11 in an upstream stage an RSVP-TE Resv message 84, and transmits to the edge device 13 in a downstream stage an RSVP-TE Path message 82.

When the output interface does not have an unused bandwidth equal to or broader than the requested bandwidth, the bandwidth management unit 32 reports to the message processing unit 31 the fact that the request for setting an MPLS tunnel is denied (step 93). When receiving this report, the message processing unit 31 transmits an error message to the edge device 11.

When it is determined that the RSVP-TE Path message 81 does not include a bandwidth request in step 91, the bandwidth management unit 32 reports to the message processing unit 31 the fact that the request for setting an MPLS tunnel is accepted immediately (step 95).

Each of the edge devices 13 and 14 also executes the similar processes, and sets an MPLS tunnel when the corresponding output interface has a sufficiently broad unused bandwidth. The edge device 13 transmits an RSVP-TE Resv message 85 to the relay device 12, and transmits an RSVP-TE Path message 83 to the edge device 14. The edge device 14 transmits an RSVP-TE Resv message 86 to the edge device 13.

A Label Distribution Protocol (LDP) is also known as a signaling protocol for setting up a pseudowire.

Non-Patent Document 1:
Network Working Group Request for Comments 3031, January 2001
Non-Patent Document 2:
Network Working Group Request for Comments 3032, January 2001
Non-Patent Document 3:
Network Working Group Request for Comments 3985, March 2005
Non-Patent Document 4:
Network Working Group Request for Comments 4664, September 2006
Non-Patent Document 5:
Network Working Group Request for Comments 3209, December 2001
Non-Patent Document 6:
Network Working Group Request for Comments 3036, January 2001
Non-Patent Document 7:
Network Working Group Request for Comments 4447, April 2006

SUMMARY

According to an aspect of the invention, a communication apparatus in a label switching network using a plurality of labels including first and second labels includes a receiving device and a storage device.

The receiving device receives signaling information for setting a first label switching tunnel. This signaling information includes one or more values of one or more second labels representing one or more pseudowires accommodated in the first label switching tunnel represented by the first label, bandwidth information of the one or more pseudowires, and a bandwidth-sharing identifier. The bandwidth-sharing identifier indicates that at least one of the one or more pseudowires shares a bandwidth with another pseudowire.

The storage device stores, for each of the plurality of first label switching tunnels, a bandwidth management table in which a correspondence relationship between values of the first and second labels, the bandwidth information, and the bandwidth-sharing identifier is registered for each of the pseudowires.

According to another aspect of the invention, a communication apparatus in a label switching network using a plurality of labels including first and second labels includes a receiving device and a storage device.

The receiving device receives signaling information for setting a first label switching tunnel. This signaling information includes one or more value of one or more second labels representing one or more second label switching tunnels accommodated in the first label switching tunnel represented by the first label, bandwidth information of the one or more second label switching tunnels, and a bandwidth-sharing identifier. This bandwidth-sharing identifier indicates that at least one of the one or more second label switching tunnels shares a bandwidth with another second label switching tunnel.

The storage device stores, for each of the plurality of first label switching tunnels, a bandwidth management table in which a correspondence relationship between values of the first and second labels, the bandwidth information, and the bandwidth-sharing identifier is registered for each of the second label switching tunnels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a first MPLS network;
FIG. 4 illustrates a first bandwidth management table;
FIG. 9 illustrates a second bandwidth management table;
FIG. 10 illustrates a relay device;
FIG. 13 illustrates pseudowires in a conventional MPLS network;
FIG. 15 illustrates reservation of bandwidths and setting of MPLS tunnels in a conventional MPLS network;
FIG. 16 illustrates a conventional bandwidth management table;
FIG. 18 illustrates an application in which a bandwidth is desirably shared by different pseudowires in different tunnels.

DESCRIPTION OF EMBODIMENTS

Figure 2:
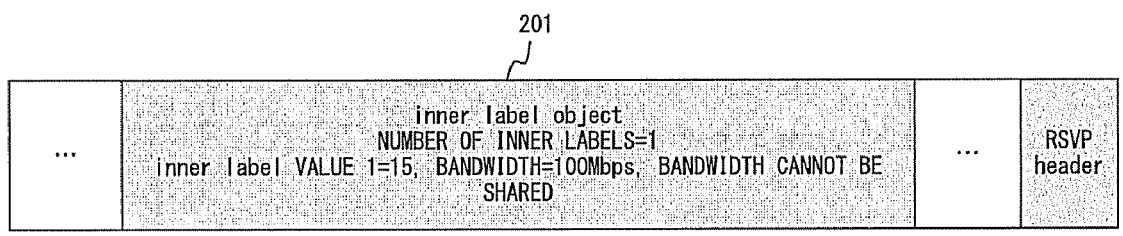
FIG. 2 illustrates a first RSVP-TE Path message.

As described above, an MPLS network manages a bandwidth for each MPLS tunnel, and accordingly can prevent a bandwidth from being shared by different pseudowires set in different MPLS tunnels.

FIG. 18 illustrates an example of an application in which it is desirable that a bandwidth be shared by different pseudowires. A packet (Ethernet (registered trademark) frame) output from the user terminal device 21 is transmitted to the pseudowire 61 or the pseudowire 64 according to the MAC destination address.

When the bandwidth used for a communication between the user terminal device 21 and the edge device 11 is assumed to be 100 Mbps, the sum of the bandwidths respectively of the pseudowire 61 and the pseudowire 64 does not exceed 100 Mbps. In such a case, sharing of the bandwidth of 100 Mbps by the pseudowires 61 and 64 would increase use efficiency of the network.

Figure 17:
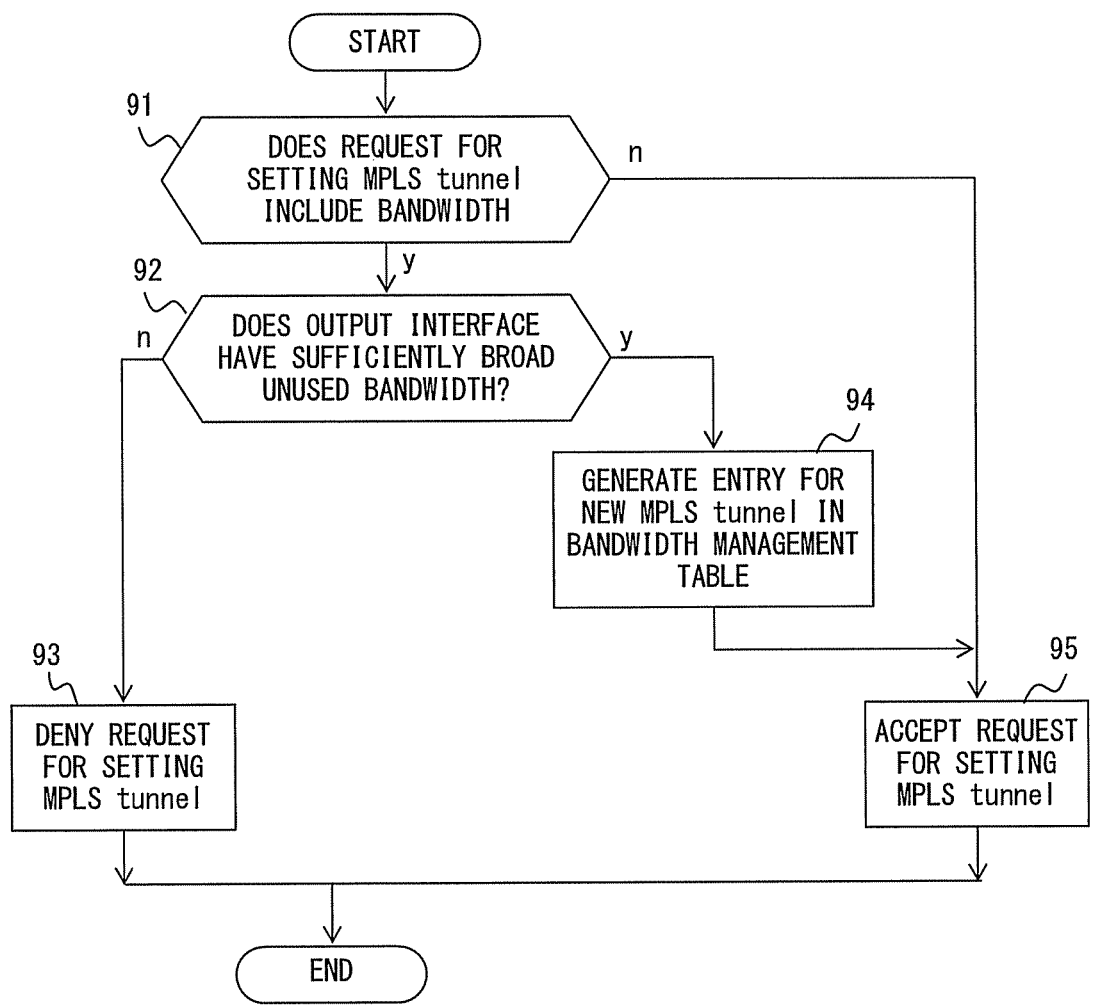
FIG. 17 is a flowchart illustrating a conventional MPLS tunnel setting process.

However, in the conventional configurations as illustrated in FIGS. 15 through 17, bandwidths are requested for MPLS tunnels and a bandwidth is managed for each MPLS tunnel. This prevents sharing of a bandwidth by the pseudowires 61 and 64 set in different MPLS tunnels, resulting in a lower use efficiency of the network.

Preferred embodiments of the present invention will be explained with reference to accompanying drawings.

When a network is to be used efficiently, it is desirable that entries in a bandwidth management table be managed for each pseudowire in MPLS tunnels instead of being managed for each of the MPLS tunnels. In addition to the above management method, it is also desired that an RSVP-TE message and a process by a bandwidth management unit be expanded in order to make it possible to make a request for setting that allows a bandwidth to be shared by a plurality of pseudowires.

Further, in order to guarantee that a packet is output using a bandwidth reserved as a setting, it is desirable that packets of the pseudowires sharing a bandwidth be accommodated in the same queue by referring to both the MPLS tunnel label and the pseudowire label and that the packets be read from the queue at the requested rate.

A communication apparatus disclosed receives a plurality of pieces of signaling information for a plurality of label switching tunnels, and generates a bandwidth management table on the basis of the received pieces of signaling information. By registering in a bandwidth management table not only the value of a first label and bandwidth information but also the value of a second label and a bandwidth-sharing identifier, it can be determined whether or not each pseudowire shares a bandwidth with another pseudowire. Accordingly, a bandwidth can be shared by different pseudowires set in different label switching tunnels.

FIG. 1 illustrates an example of a configuration of an MPLS network according to an embodiment. The MPLS network includes edge devices 111, 113, and 114, and a relay device 112. User terminal devices 121, 122, and 123 are connected to the edge devices 111, 113, and 114, respectively. The edge devices 111, 113, and 114 have MAC switches 141, 142, and 143 respectively, and the relay device 112 has a message processing unit 131 and a bandwidth management unit 132.

An MPLS tunnel 151 is set between the edge devices 111 and 114, and an MPLS tunnel 152 is set between the edge devices 111 and 113. An MPLS tunnel 153 is set between the edge devices 113 and 114, and an MPLS tunnel 154 is set between the relay device 112 and the edge device 113.

Also, pseudowires 161 and 162 are set in the MPLS tunnel 151, pseudowires 163 and 164 are set in the MPLS tunnel 152, and pseudowires 165 and 166 are set in the MPLS tunnel 153.

The relay device 112 communicates with the edge device 111 via an interface 171, and communicates with the edge device 113 via an interface 172.

Here, it is assumed as the initial state that while the pseudowires 162 through 164 have been set, the pseudowire 161 has not been set yet. In this state, an RSVP-TE Path message 181 and an RSVP-TE Resv message 184 for the MPLS tunnels 151 and 152 are exchanged between the edge device 111 and the relay device 112.

FIG. 2 illustrates an example of a configuration of an RSVP-TE Path message for the MPLS tunnel 151. This message includes an inner label object 201 in addition to the elements included in the conventional RSVP-TE Path message.

In general, a number of inner labels, an inner label value, a bandwidth, and whether or not the bandwidth can be shared are set in an inner label object. When a bandwidth can be shared, a bandwidth-sharing identifier is also set. An inner label corresponds to the label that is inner than the other label in the two labels in a two-stage configuration i.e., corresponds to a pseudowire label.

The inner label object 201 in FIG. 2 specifies that the number of inner labels is 1, the inner label value and the bandwidth of the pseudowire 162 are 15 and 100 Mbps respectively, and the bandwidth cannot be shared.

Figure 3:
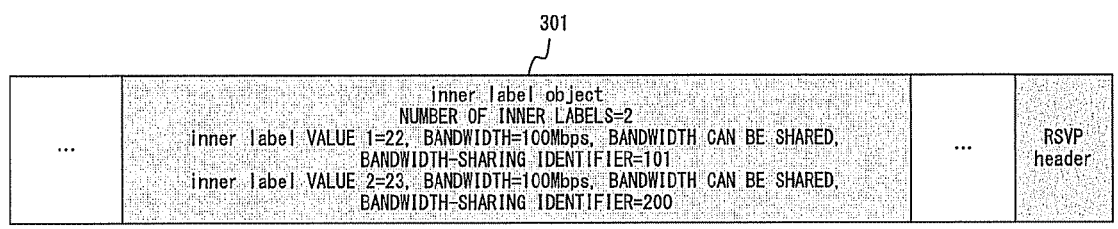
FIG. 3 illustrates a second RSVP-TE Path message.

FIG. 3 illustrates an example of a configuration of an RSVP-TE Path message for the MPLS tunnel 152. An inner label object 301 specifies that the number of inner labels is 2 and information on the pseudowires 163 and 164 is set.

The inner label value and the bandwidth of the pseudowire 163 are 23 and 100 Mbps respectively, and the pseudowire 163 can share a bandwidth with another pseudowire. The bandwidth-sharing identifier is 101. The inner label value and the bandwidth of the pseudowire 164 are 22 and 100 Mbps respectively, the pseudowire 164 can share a bandwidth with another pseudowire, and the bandwidth-sharing identifier is 200.

In the above situation, the bandwidth management table, for the interface 172, held by the bandwidth management unit 132 of the relay device 112, is as illustrated in, for example, FIG. 4. This bandwidth management table is obtained by adding information such as an inner label value, whether or not a bandwidth can be shared, and a bandwidth-sharing identifier to the bandwidth management table illustrated in FIG. 16. Information to be registered in bandwidth management tables is obtained from RSVP-TE Path messages.

That a bandwidth management table has an inner label value makes it possible to manage a bandwidth for each pseudowire. Also, that information about whether or not a bandwidth can be shared and a bandwidth-sharing identifier are held makes it possible for different pseudowires to share a bandwidth.

In the bandwidth management table illustrated in FIG. 4, information of an identifier IF2 of the interface 172 and the MPLS tunnels 151, 152, and 154 using the interface 172 is registered. The interface 172 is 1000 Mbps in link capacity and has an unused bandwidth of 500 Mbps.

The information on the MPLS tunnel 151 includes identifier Tunnel1 and a label value 45 of the MPLS tunnel 151 and information on the pseudowire 162 set in the MPLS tunnel 151. The information on the pseudowire 162 includes an inner label value 15, the fact that the pseudowire 162 cannot share a bandwidth, and 100 Mbps as the bandwidth. Accordingly, the pseudowire 162 exclusively uses the bandwidth of 100 Mbps.

The information on the MPLS tunnel 152 includes identifier Tunnel2 and a label value 46 of the MPLS tunnel 152 and information on the pseudowires 163 and 164 set in the MPLS tunnel 152. The information on the pseudowire 164 includes an inner label value 22, the fact that the pseudowire 164 can share a bandwidth, a bandwidth-sharing identifier 101, and 100 Mbps as the bandwidth. The information on the pseudowire 163 includes an inner label value 23, the fact that the pseudowire 163 can share a bandwidth, a bandwidth-sharing identifier 200, and 100 Mbps as the bandwidth.

In such a case, the pseudowires 163 and 164 have a property that allows them to share a bandwidth; however, because there are no other pseudowires having the same bandwidth-sharing identifier, the pseudowires 163 and 164 each exclusively use 100 Mbps bandwidths.

The information on the MPLS tunnel 154 includes identifier Tunnel4 and a label value 47 of the MPLS tunnel 154, and 200 Mbps as the bandwidth. Because the MPLS tunnel 154 is a tunnel set on the basis of a conventional RSVP-TE Path message, information of an inner label value, whether or not a pseudowire can share a bandwidth, or a bandwidth-sharing identifier is not included.

In this state, it is assumed that label mapping messages based on the LDP are exchanged between the edge devices 111 and 114 for setting the pseudowire 161 and that the label value of the pseudowire 161 is fixed to 16. At that time, the label value of 16 of the pseudowire 161 is inserted into the PSVP-TE Path message 181 in order to report to the relay device 112 that the pseudowire 161 is to be transmitted through the MPLS tunnel 151.

Figure 5:
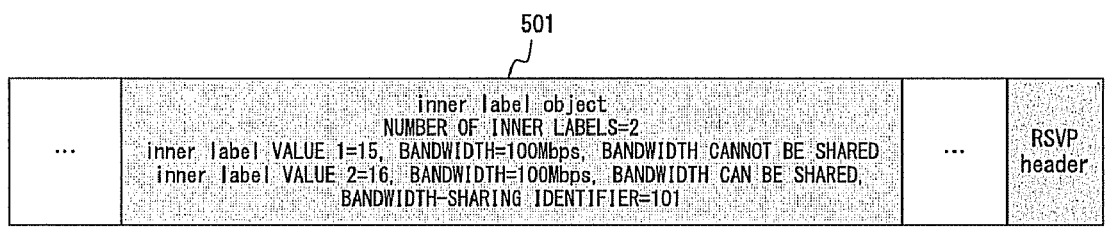
FIG. 5 illustrates a third RSVP-TE Path message.

FIG. 5 illustrates an example of a configuration of an RSVP-TE Path message for the MPLS tunnel 151 to be used in the above case. An inner label object 501 specifies that the number of inner labels is 2 and information on the pseudowires 161 and 162 is set. The information on the pseudowire 162 is similar to the counterpart in the case illustrated in FIG. 2. The inner label value and the bandwidth of the pseudowire 161 are 16 and 100 Mbps respectively. The pseudowire 161 can share a bandwidth with another pseudowire, and the bandwidth-sharing identifier is 101.

In the above state, the content of the RSVP-TE Path message for the MPLS tunnel 151 is not fixed, and the "make-before-break" procedures as described in chapter 2.5 in non-Patent document 5 are followed.

When receiving the RSVP-TE Path message 181 from the edge device 111, the message processing unit 131 in the relay device 112 requests the bandwidth management unit 132 to perform a process of setting an MPLS tunnel. The bandwidth management unit 132 checks an unused bandwidth of the interface 172, which is an output interface of the MPLS tunnel 151, and reserves a bandwidth for a new pseudowire 161.

Figure 6:
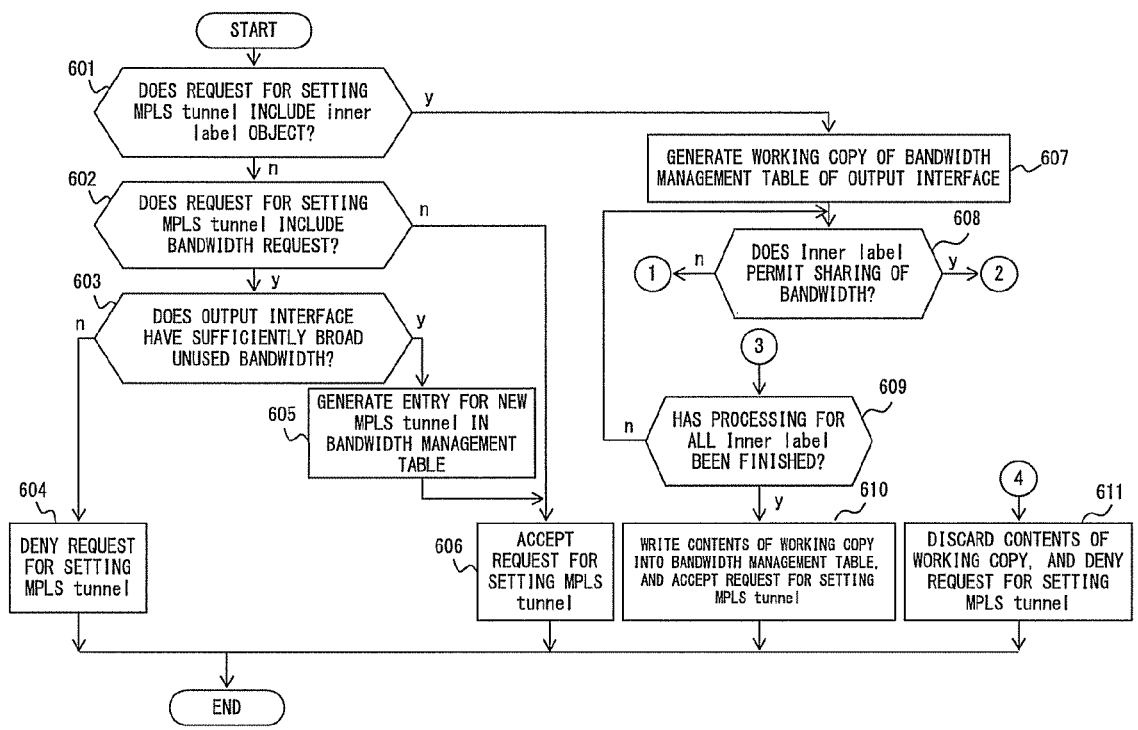
FIG. 6 is a flowchart illustrating an MPLS tunnel setting process (first)
Figure 7:
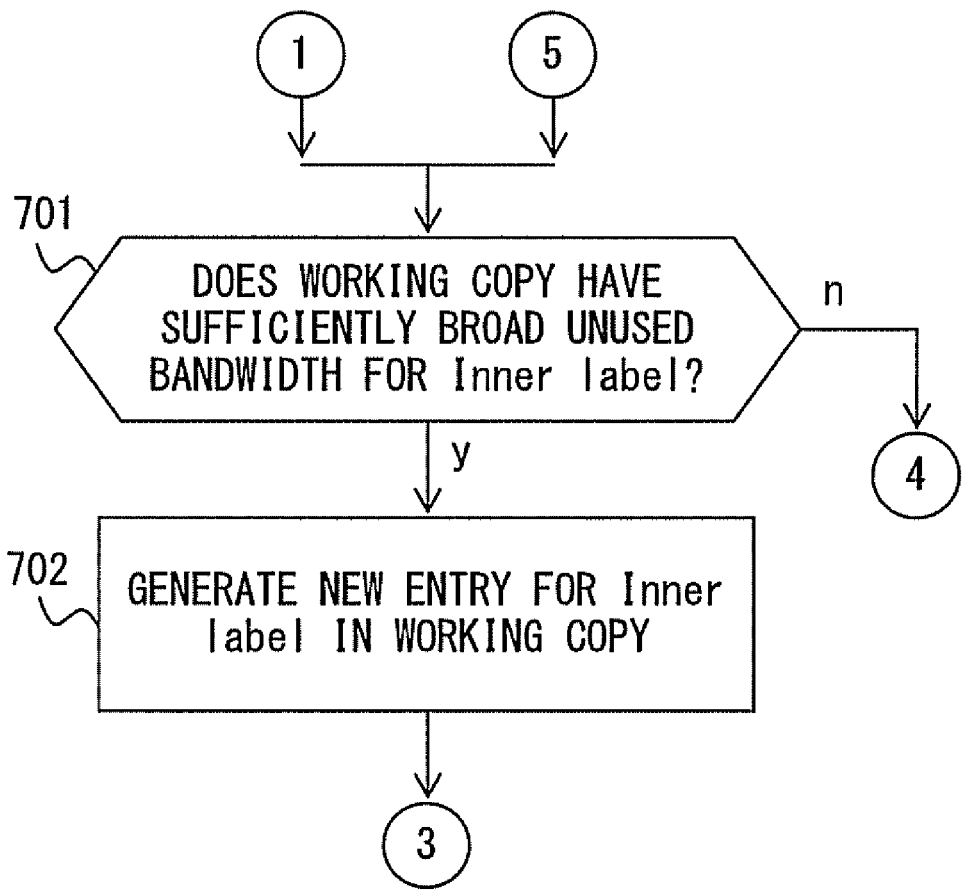
FIG. 7 is a flowchart illustrating an MPLS tunnel setting process (second)
Figure 8:
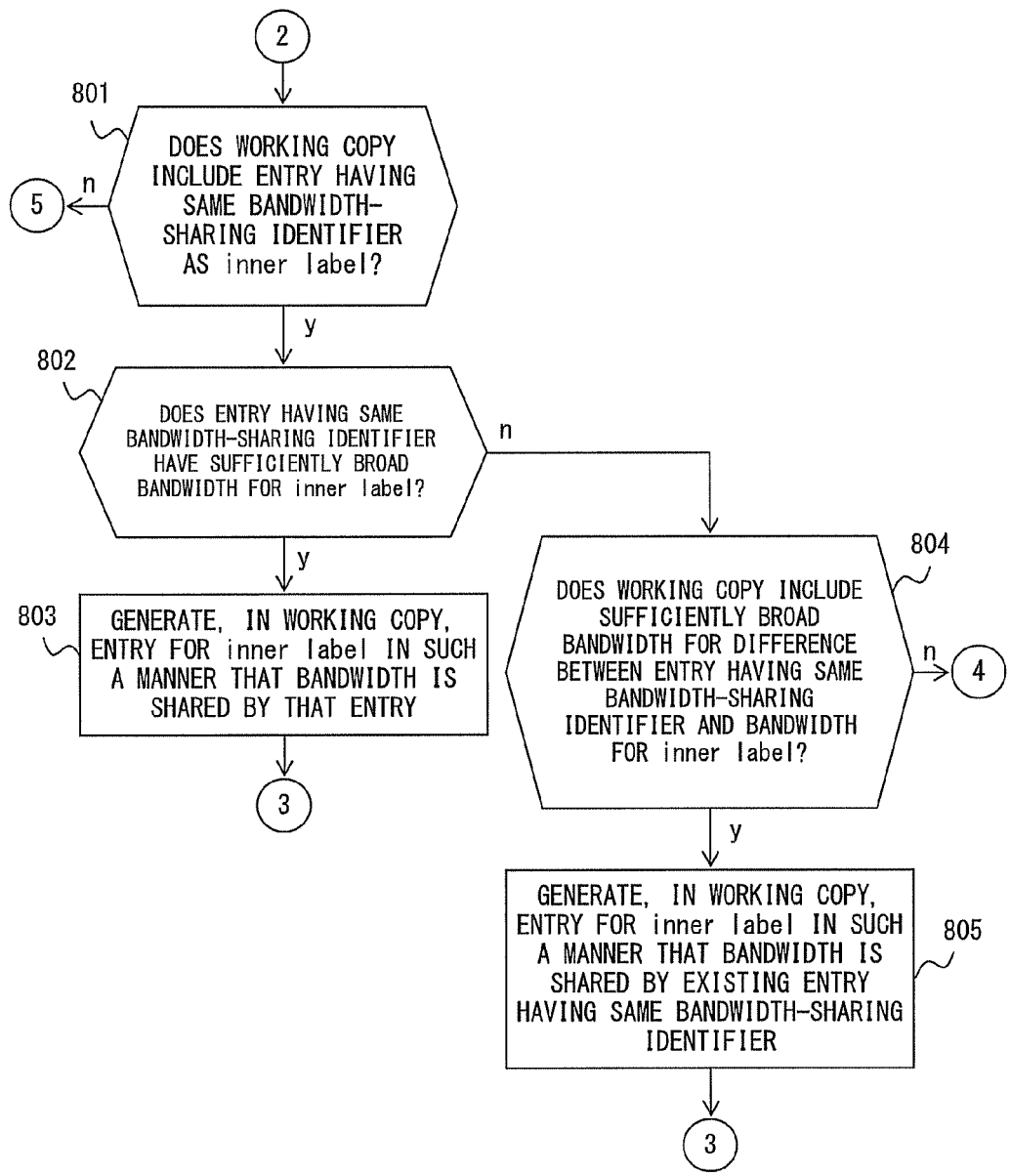
FIG. 8 is a flowchart illustrating an MPLS tunnel setting process (third)

FIGS. 6 through 8 are flowcharts illustrating a process of setting an MPLS tunnel performed by the bandwidth management unit 132. The bandwidth management unit 132 first checks whether or not the RSVP-TE Path message 181 includes an inner label object (step 601). When the message does not include an inner label object, processes similar to those in FIG. 17 are executed (steps 602 through 606).

When the RSVP-TE Path message 181 includes an inner label object, the bandwidth management unit 132 copies a bandwidth management table for the interface 172 in order to generate a working copy of the table (step 607). Thereafter, the bandwidth management unit 132 checks whether or not a bandwidth can be shared for each of the inner labels included in the inner label object (step 608).

When a bandwidth can not be shared, the bandwidth management unit 132 compares the unused bandwidth in the working copy with the bandwidth requested for the inner label (step 701) When the unused bandwidth is equal to or broader than the requested bandwidth, the bandwidth management unit 132 reduces that unused bandwidth by the bandwidth of the requested bandwidth, and generates an entry for that inner label in the working copy (step 702).

Next, the bandwidth management unit 132 checks whether or not entries for all the inner labels included in the inner label object have been generated in the working copy (step 609) If there is still an inner label that does not have an entry for it, the bandwidth management unit 132 repeats the processes in and after step 608.

When entries for all the inner labels have been generated, the bandwidth management unit 132 writes the contents of the working copy into the bandwidth management table of the interface 172, and reports to the message processing unit 131 the fact that the request for setting an MPLS tunnel is accepted (step 610).

When receiving this report, the message processing unit 131 transmits the RSVP-TE Resv message 184 to the edge device 111 in an upstream stage, and transmits an RSVP-TE Path message 182 to the edge device 113 in a downstream stage.

When the unused bandwidth is narrower than the requested bandwidth in step 701, the bandwidth management unit 132 discards the working copy and reports to the message processing unit 131 the fact that the request for setting an MPLS tunnel is denied (step 611) When receiving this report, the message processing unit 131 transmits an error message to the edge device 111.

When it is determined in step 608 that a bandwidth can be shared, the bandwidth management unit 132 checks whether or not the working copy already includes an entry having the same bandwidth-sharing identifier (step 801). When the working copy does not have an existing entry having the same bandwidth-sharing identifier, the bandwidth management unit 132 executes processes in and after step 701.

When the working copy has an entry having the same bandwidth-sharing identifier, the bandwidth management unit 132 compares the bandwidth of that entry with the bandwidth requested for the inner label (step 802). When the bandwidth of that entry is equal to or broader than the requested bandwidth, the bandwidth management unit 132 generates an entry for an inner label in the working copy in such a manner that a bandwidth is shared by the entry of the above comparison and the entry being generated (step 803). Thereafter, the bandwidth management unit 132 executes the processes in and after step 609.

When the bandwidth of the entry is narrower than the requested entry, the bandwidth management unit 132 calculates the difference between the bandwidth of that entry and the requested bandwidth, and compares the calculated difference with the unused bandwidth on the working copy (step 804). When the unused bandwidth is equal to or broader than the difference, the bandwidth management unit 132 reduces the unused bandwidth in the working copy by that difference, and changes the bandwidth of that entry to the requested bandwidth. Thereafter, the bandwidth management unit 132 generates an entry for an inner label in such a manner that a bandwidth is shared by that entry and the entry being generated (step 805), and executes the processes in and after step 609.

When the unused bandwidth is narrower than the difference, the bandwidth management unit 132 discards the working copy, and reports to the message processing unit 131 the fact that the request for setting an MPLS tunnel is denied (step 611).

The edge devices 113 and 114 execute the similar processes as well in order to write entries for new inner labels into the bandwidth management tables. The edge device 113 transmits to the relay device 112 an RSVP-TE Resv message 185, and transmits to the edge device 114 a RSVE-TE Path message 183. The edge device 114 transmits to the edge device 113 an RSVP-TE Resv message 186.

In the case of the bandwidth management table illustrated in FIG. 4, a bandwidth of 100 Mbps has already been reserved for the pseudowire 164, which has the same bandwidth-sharing identifier 101 as the pseudowire 161. Accordingly, the unused bandwidth in the bandwidth management table is not changed, and an entry of the pseudowire 161 is generated in such a manner that the pseudowires 164 and 161 share the bandwidth.

FIG. 9 illustrates a bandwidth management table to which an entry for the pseudowire 161 has been added. The information on the MPLS tunnel 151 includes an entry for the pseudowire 161 in addition to an entry for the pseudowire 162. The entry for the pseudowire 161 includes an inner label value 16, whether or not a bandwidth can be shared, and 100 Mbps as the bandwidth. The pseudowires 161 and 164 have an attribute indicating that a bandwidth can be shared, and also have the same bandwidth-sharing identifiers 101, meaning that these two pseudowires share a bandwidth of 100 Mbps.

In the example illustrated in FIG. 9, two pseudowires share a bandwidth; however, three or more pseudowires can share a bandwidth in the same configuration. Accordingly, bandwidths can be reserved in such a manner that a bandwidth can be shared by a plurality of pseudowires transmitted through different tunnels.

Next, explanations will be given for a configuration and operations of the relay device 112 for reading packets in the reserved bandwidth.

FIG. 10 illustrates an example of a configuration of the relay device 112. The relay device 112 includes a message processing unit 131, a bandwidth management unit 132, message extraction/insertion units 1001 and 1006, a forwarding processing unit 1002, a queuing processing unit 1003, queues 1004-1 through 1004-N, and a read controlling unit 1005. The identifiers of the queues 1004-1 through 1004-N are "queue1" through "queueN" respectively.

The bandwidth management unit 132 holds a bandwidth management table as illustrated in FIG. 9. An MPLS tunnel label value to be registered in the bandwidth management table is reported from the edge device 113 in a downstream stage that is included in the RSVP-TE Resv message 185. The RSVP-TE Resv message 185 is a message for reporting the setting of an MPLS tunnel in response to the RSVP-TE Path message 182 that requests the setting of an MPLS tunnel.

The relay device 112 determines the destination of forwarding a packet in a similar manner to the conventional relay devices. However, the relay device 112 is different from the conventional relay devices in that it performs queuing of packets on the basis of labels in a two-stage configuration, i.e., the outer label and the inner label.

The RSVP-TE Path message 181 is received by the interface 171, and is forwarded to the message processing unit 131 via the message extraction/insertion unit 1001. The RSVP-TE Resv message 185 is received by the interface 172, and is forwarded to the message processing unit 131 via the message extraction/insertion unit 1006.

The message processing unit 131 processes these signaling messages, and generates a forwarding table 1011 to set it in the forwarding processing unit 1002. In the forwarding table 1011, a set of an identifier of an output interface and an output label value is set for each of the input label values.

The bandwidth management unit 132 executes the MPLS tunnel setting process illustrated in FIGS. 6 through 8 to set a bandwidth management table.

The queuing processing unit 1003 generates a queuing table 1012 on the basis of the contents of the bandwidth management table. In the queuing table 1012, an identifier of a queue is registered for each set of an outer label value representing an MPLS tunnel label value and an inner label value representing a pseudowire label value.

After the forwarding table 1011 and the queuing table 1012 have been set, a packet 1021 having a label stack consisting of labels in a two-stage configuration is received by the interface 171. This packet 1021 is forwarded to the forwarding processing unit 1002 via the message extraction/insertion unit 1001.

The forwarding processing unit 1002 forwards the packet 1021 referring to the forwarding table 1011. For example, when the outermost label value (outer label value) in the label stack in the packet 1021 is "30", that label value is updated to "45" according to the forwarding table 1011, and the packet 1021 is forwarded to the queuing processing unit 1003 corresponding to IF2.

The queuing processing unit 1003 sorts the packet to one of the queues 1004-1 through 1004-N according to the queuing table 1012 and the bandwidth managing table. For this, the queuing processing unit 1003 confirms the label values of two stages from the head of the packet in order to perform the sorting in such a manner that packets of pseudowires sharing a certain bandwidth are sorted into the same queue according to the contents of the bandwidth management table.

In the case of the packet 1021, the outer label has been updated to "45" and the second label value (inner label value) counting from the outermost label is "15", and accordingly the packet 1021 is sorted into the queue 1004-1 corresponding to queue1.

The bandwidth management table in FIG. 9 indicates that the pseudowire 161 with an MPLS tunnel label value of "45" and an inner label value of "16" and the pseudowire 164 with an MPLS tunnel label value of "46" and an inner label value of "22" have the same bandwidth-sharing identifier 101. This means that a packet with an outer label value of "45" and an inner label value of "16" and a packet with an outer label value of "46" and an inner label value of "22" are sorted into the same queue.

The read controlling unit 1005 refers to the contents of the bandwidth managing table in order to read packets from the queues 1004-1 through 1004-N according to the bandwidths respectively assigned to the pseudowires. As the reading algorithm, an algorithm such as deficit weighted round robin is used. The read packet is multiplexed, and is output from the interface 172 via the message extraction/insertion unit 1006.

The communication apparatus disclosed enables a bandwidth to be shared by different pseudowires set in different MPLS tunnels, leading to a higher use efficiency of the network.

Explanations have been given to control for the case where pseudowires are encapsulated in MPLS tunnels in the above embodiments; however, this control can also be applied to a case where a first MPLS tunnel accommodates a second MPLS tunnel.

As the inner label value for such a case, the label value of a second MPLS tunnel is used instead of the label value of a pseudowire, and a packet having labels in a two-stage configuration is transmitted through the second MPLS tunnel. In this type of MPLS network, a bandwidth can be shared by different MPLS tunnels set in different MPLS tunnels, improving the use efficiency of the network.

Further, a pseudowire or a third MPLS tunnel can also be transmitted through a second MPLS tunnel. In such a case, a packet transmitted through an MPLS network has labels in a three-stage configuration.

Figure 11:
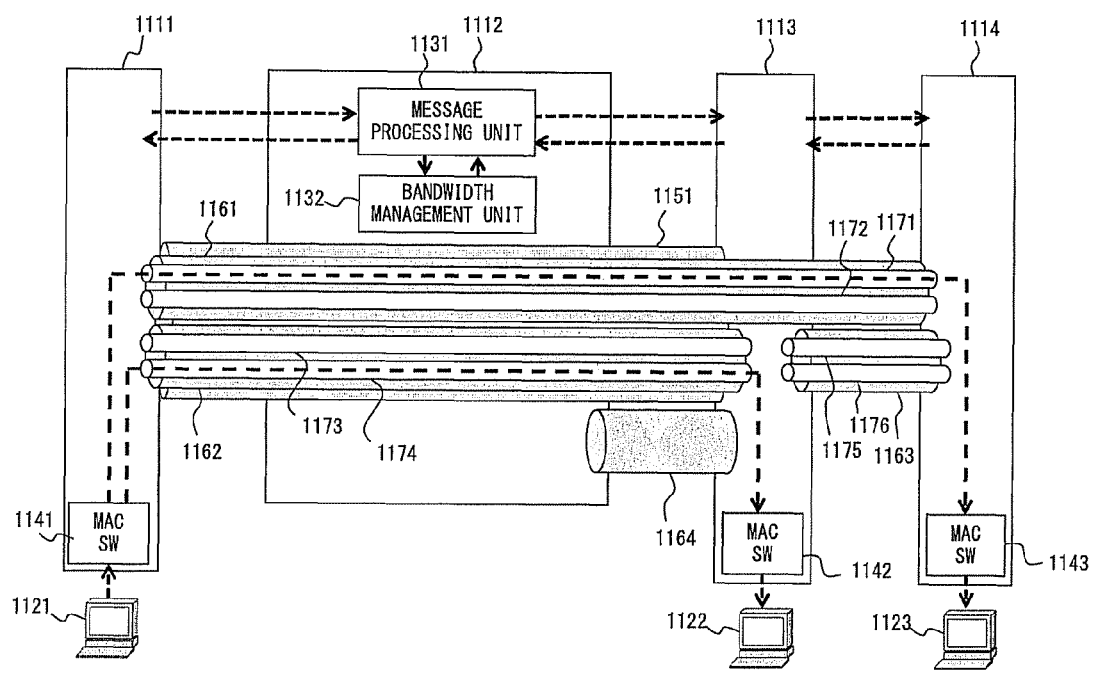
FIG. 11 illustrates a configuration of a second MPLS network.

FIG. 11 illustrates an example of a configuration of an MPLS network for transmitting packets using labels in a three-stage configuration as described above. The MPLS network is provided with edge devices 1111, 1113, and 1114, and a relay device 1112. User terminal devices 1121, 1122, and 1123 are connected to the edge devices 1111, 1113, and 1114 respectively. The edge devices 1111, 1113, and 1114 are equipped with MAC switches 1141, 1142, and 1143 respectively. The user terminal device 1121 is equipped with a message processing unit 1131 and a bandwidth management unit 1132.

An MPLS tunnel 1151 is set between the edge devices 1111 and 1113, and MPLS tunnels 1161 and 1162 are set in the MPLS tunnel 1151. The MPLS tunnel 1161 is set between the edge devices 1111 and 1114, and the MPLS tunnel 1162 is set between the edge devices 1111 and 1113.

An MPLS tunnel 1163 is set between the edge devices 1113 and 1114, and an MPLS tunnel 1164 is set between the relay devices 1112 and 1113.

Also, pseudowires 1171 and 1172 are set in the MPLS tunnel 1161, pseudowires 1173 and 1174 are set in the MPLS tunnel 1162, and pseudowires 1175 and 1176 are set in the MPLS tunnel 1163.

Figure 12:
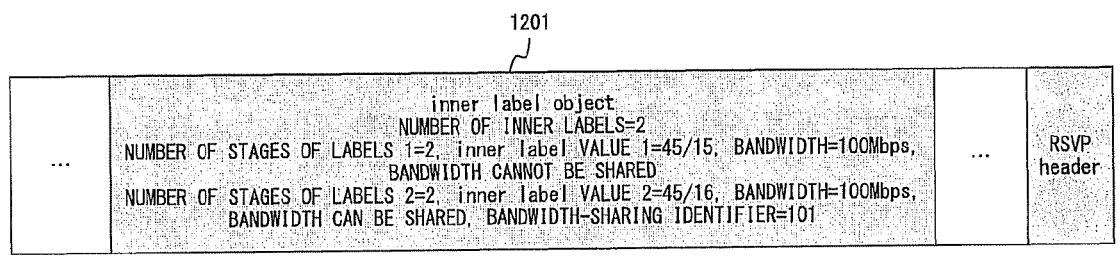
FIG. 12 illustrates a fourth RSVP-TE Path message.
Figure 14:
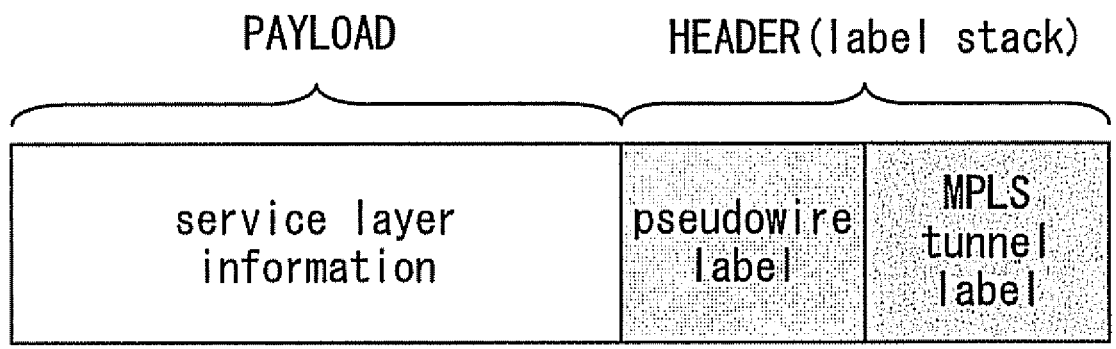
FIG. 14 illustrates a packet having labels in a two-stage configuration based on a conventional technique.

FIG. 12 illustrates an example of a configuration of an RSVP-TE Path message for the MPLS tunnel 1151 in the MPLS network illustrated in FIG. 11. In an inner label object 1201, the fact that the number of inner labels is 2 and information on the pseudowires 1171 and 1172 are set.

The number of stages of labels of the pseudowire 1172 is 2, the inner label values of pseudowire 1172 are 45 and 15, and the bandwidth is 100 Mbps. The pseudowire 1172 cannot share a bandwidth. The number of stages of labels of the pseudowire 1171 is 2, the inner label values of the pseudowire 1171 are 45 and 16, and the bandwidth is 100 Mbps. The pseudowire 1171 can share a bandwidth, and the bandwidth-sharing identifier is 101.

As described above, not only the label values of respective pseudowires but also the label value of the MPLS tunnel 1161 accommodating the pseudowires is set in the inner label object 1201.

The bandwidth management unit 1132 generates a bandwidth management table on the basis of an RSVP-TE Path message as described above. This bandwidth management table has a configuration of, for example, a bandwidth management table obtained by changing into a two-stage configuration the MPLS tunnel label value in the table in FIG. 9.

In the MPLS network illustrated in FIG. 11, a packet to which labels in a three-stage configuration (MPLS tunnel labels in a two-stage configuration and a pseudowire label in a one-stage configuration) has been added is transmitted. The relay device 1112 generates a queuing table according to a bandwidth management table, and sorts the packet into queues referring to the labels in a three-stage configuration.

It is also possible to increase the number of stages of labels added to a packet to four or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication apparatus in a label switching network using a plurality of labels including first and second labels, the communication apparatus comprising:

a receiver configured to receive, as signaling information for setting a label switching tunnel, signaling information including one or more values of one or more second labels representing one or more pseudowires accommodated in the label switching tunnel represented by the first label, bandwidth information of the one or more pseudowires, and a bandwidth-sharing identifier indicating that at least one of the one or more pseudowires shares a bandwidth with another pseudowire; and a storage device to store, for each of a plurality of label switching tunnels, a bandwidth management table in which a correspondence relationship between values of the first and second labels, the bandwidth information, and the bandwidth-sharing identifier is registered for each of the pseudowires, wherein the communication apparatus is a relay device located midway between a first edge device and a second edge device in the label switching network, and the label switching tunnel and the one or more pseudowires accommodated in the label switching tunnel are provided between the first edge device and the second edge device.

2. The communication apparatus according to claim 1, further comprising:

a processor configured to sort a packet to one of a plurality of queues, wherein:

the receiver receives a packet to which the plurality of labels have been added; and the processor sorts to a same queue a plurality of packets having values of a plurality of first and second labels corresponding to a same bandwidth-sharing identifier among the values of the first and second labels registered in the bandwidth management table.

3. The communication apparatus according to claim 1, wherein the receiver receives information indicating whether a bandwidth is allowed to be shared by at least one of the one or more pseudowires with another pseudowire.

4. The communication apparatus according to claim 3, wherein the storage device stores the information indicating whether the bandwidth is allowed to be shared.

5. A communication apparatus in a label switching network using a plurality of labels including first and second labels, the communication apparatus comprising:

a receiver configured to receive, as signaling information for setting a first label switching tunnel, signaling information including one or more values of one or more second labels representing one or more second label switching tunnels accommodated in the first label switching tunnel represented by the first label, bandwidth information of the one or more second label switching tunnels, and a bandwidth-sharing identifier indicating that at least one of the one or more second label switching tunnels shares a bandwidth with another second label switching tunnel; and a storage device to store, for each of a plurality of first label switching tunnels, a bandwidth management table in which a correspondence relationship between values of the first and second labels, the bandwidth information, and the bandwidth-sharing identifier is registered for each of the second label switching tunnels, wherein the communication apparatus is a relay device located midway between a first edge device and a second edge device in the label switching network, and the first label switching tunnel and the one or more second label switching tunnels accommodated in the first label switching tunnel are provided between the first edge device and the second edge device.

6. The communication apparatus according to claim 5, further comprising:

a processor configured to sort a packet to one of a plurality of queues, wherein:

the receiver receives a packet to which the plurality of labels have been added; and the processor sorts to a same queue a plurality of packets having values of a plurality of first and second labels corresponding to a same bandwidth-sharing identifier among the values of the first and second labels registered in the bandwidth management table.

7. The communication apparatus according to claim 5, wherein the receiver receives information indicating whether a bandwidth is allowed to be shared by at least one of the one or more second label switching tunnels with another second label switching tunnel.

8. The communication apparatus according to claim 7, wherein the storage device stores the information indicating whether the bandwidth is allowed to be shared.

9. A communication method of a communication apparatus in a label switching network using a plurality of labels including first and second labels, the communication method comprising:

receiving, as signaling information for setting a label switching tunnel, signaling information including one or more values of one or more second labels representing one or more pseudowires accommodated in the label switching tunnel represented by the first label, bandwidth information of the one or more pseudowires, and a bandwidth-sharing identifier indicating that at least one of the one or more pseudowires shares a bandwidth with another pseudowire;

generating, for each of a plurality of label switching tunnels, a bandwidth management table in which a correspondence relationship between values of the first and second labels, the bandwidth information, and the bandwidth-sharing identifier is registered for each of the pseudowires;

receiving a packet to which the plurality of labels have been added; and sorting, to a same queue among a plurality of queues, a plurality of packets having values of a plurality of first and second labels corresponding to a same bandwidth-sharing identifier among the values of the first and second labels registered in the bandwidth management table, wherein the communication apparatus is a relay device located midway between a first edge device and a second edge device in the label switching network, and the label switching tunnel and the one or more pseudowires accommodated in the label switching tunnel are provided between the first edge device and the second edge device.

10. The communication method according to claim 9, wherein the receiving receives information indicating whether a bandwidth is allowed to be shared by at least one of the one or more pseudowires with another pseudowire.

11. The communication method according to claim 10, wherein the generating generates the information indicating whether the bandwidth is allowed to be shared.

12. A communication method of a communication apparatus in a label switching network using a plurality of labels including first and second labels, the communication method comprising:

receiving, as signaling information for setting a first label switching tunnel, signaling information including one or more values of one or more second labels representing one or more second label switching tunnels accommodated in the first label switching tunnel represented by the first label, bandwidth information of the one or more second label switching tunnels, and a bandwidth-sharing identifier indicating that at least one of the one or more second label switching tunnels shares a bandwidth with another second label switching tunnel;

generating, for each of a plurality of first label switching tunnels, a bandwidth management table in which a correspondence relationship between values of the first and second labels, the bandwidth information, and the bandwidth-sharing identifier is registered for each of the second label switching tunnels;

receiving a packet to which the plurality of labels have been added; and sorting, to a same queue among a plurality of queues, a plurality of packets having values of a plurality of first and second labels corresponding to a same bandwidth-sharing identifier among the values of the first and second labels registered in the bandwidth management table, wherein the communication apparatus is a relay device located midway between a first edge device and a second edge device in the label switching network, and the first label switching tunnel and the one or more second label switching tunnels accommodated in the first label switching tunnel are provided between the first edge device and the second edge device.

13. The communication method according to claim 12, wherein the receiving receives information indicating whether a bandwidth is allowed to be shared by at least one of the one or more second label switching tunnels with another second label switching tunnel.

14. The communication method according to claim 13, wherein the generating generates the information indicating whether the bandwidth is allowed to be shared.

* * * * *